Mar. 13, 1923.
E. I. CUSTER
VEHICLE JACK
Original Filed Apr. 11, 1921
1,448,261
2 sheets-sheet 1
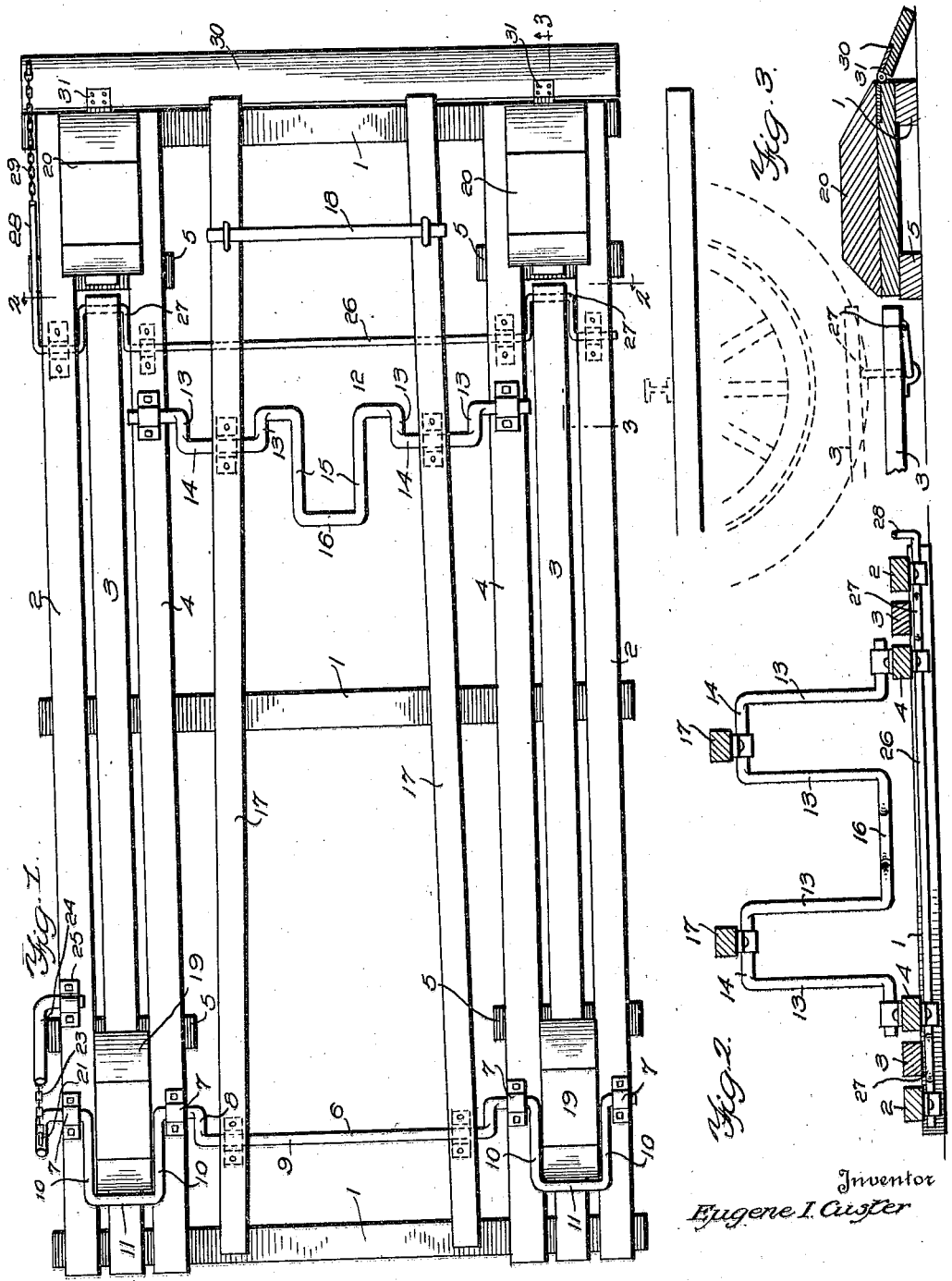
Inventor
Eugene I. Custer
By Ch. Parker
Attorney

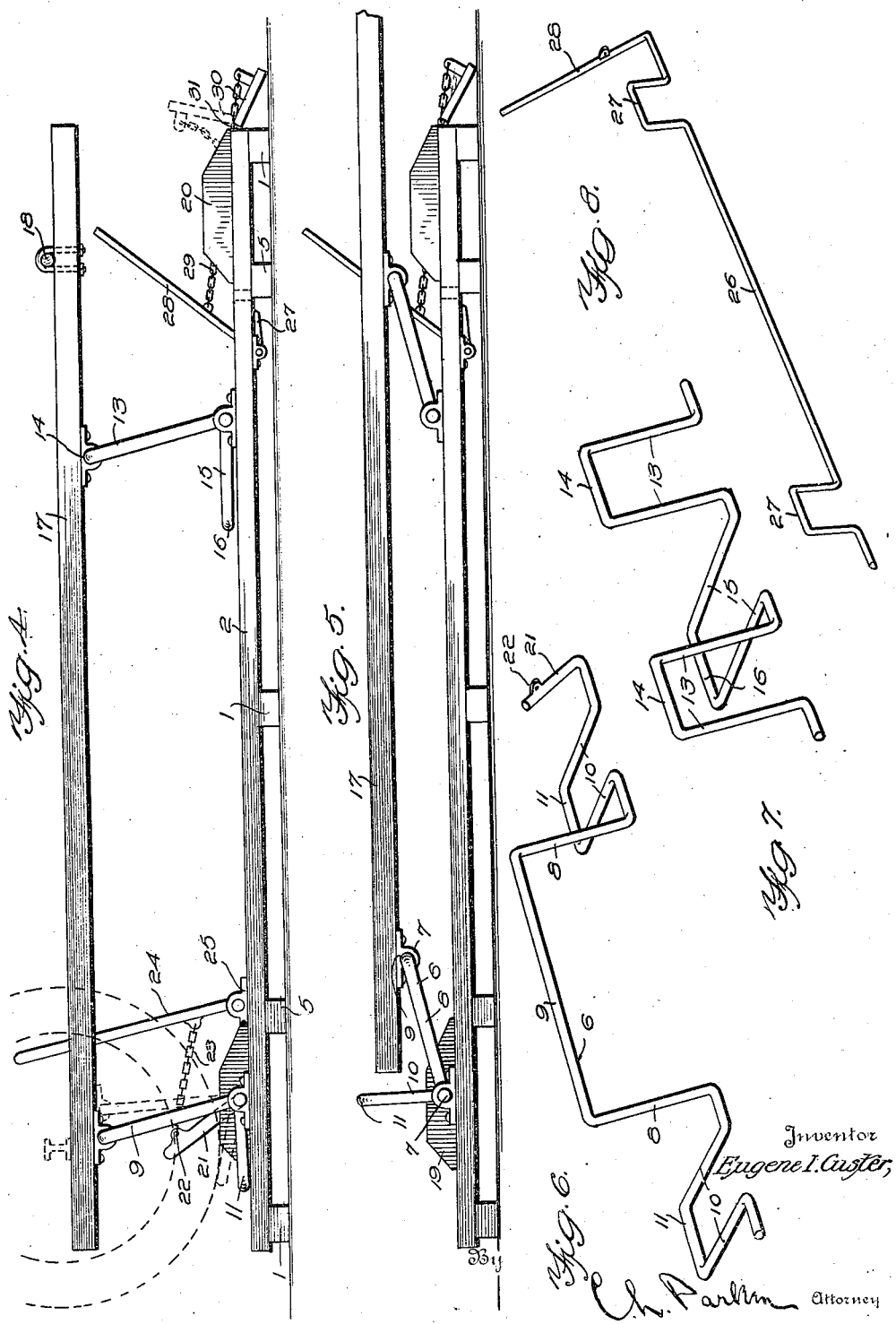

Patented Mar. 13, 1923.

1,448,261

UNITED STATES PATENT OFFICE.

EUGENE I. CUSTER, OF JACKSONVILLE, FLORIDA.

VEHICLE JACK.

Application filed April 11, 1921, Serial No. 460,311. Renewed August 7, 1922. Serial No. 580,279.

*To all whom it may concern:*

Be it known that I, EUGENE I. CUSTER, a citizen of the United States, residing at Jacksonville, in the county of Duval and State of Florida, have invented certain new and useful Improvements in Vehicle Jacks, of which the following is a specification.

This invention relates to vehicle jacks, and it comprises a frame, front and rear shafts arranged on said frame, said shafts being provided with cranks, a pair of longitudinal supporting members secured to said cranks, an actuating member secured to one of said shafts adapted to engage a portion of the vehicle to initially raise the supporting beams, inclined blocks arranged adjacent the ends of the shafts, and means for moving the longitudinal beams forwardly to position the wheels of the vehicle in front of said blocks.

In the present invention, I have provided a vehicle jack or support for motor vehicles, when standing, including a pair of beams adapted to be arranged longitudinally of the car, said beams being capable of being raised to lift the wheels off the ground and thus remove unnecessary strain from the tires while the vehicle is standing. I further provide means whereby the vehicle may be run onto the jack and raised by its own power without the necessity of operating cranks or levers manually or by the means of outside power. One of the crank shafts is provided with an actuating member arranged at substantially right angles to the crank portions which support the beam. This actuating member is normally in a raised position when the longitudinal beams are lowered and the vehicle running onto the jack strikes this member and moves it through a portion of a revolution and slightly raises the longitudinal beams. The other shaft is provided with a pair of similarly arranged members positioned near each side in the path of the wheels, and adapted to swing over a pair of inclined blocks. The front wheels of the vehicle in passing over the inclined blocks are adapted to engage these members and lower them to a nearly horizontal position at the time the cranks are in a vertical position and the longitudinal beams raised. Further forward movement of the machine depresses these members to a substantially horizontal position and moves the cranks past center to move the vehicle forwardly and disengage the wheel from the inclined blocks.

The invention further comprises means for permitting the removal of a vehicle including a pair of planks or runways adapted to be arranged under the rear wheel and spaced therefrom when in normal position. The planks are capable of being raised and a crank shaft is provided for raising them to engage the rear wheels and furnish traction.

In the accompanying drawings, I have shown one embodiment of the invention. In this showing:

Figure 1 is a plan view,

Figure 2 is a vertical transverse sectional view on line 2—2 of Figure 1,

Figure 3 is a detail sectional view on line 3—3 of Figure 1,

Figure 4 is a side elevation showing the longitudinal beams in raised position,

Figure 5 is a similar view showing the longitudinal beams in lowered position,

Figure 6 is a detail perspective view of the front crank shaft,

Figure 7 is a similar view of the rear crank shaft, and,

Figure 8 is a similar view of the auxiliary crank shaft.

Referring to the drawings, the reference numeral 1 designates transverse beams forming a portion of the frame. Any suitable number of transverse beams may be employed. At each side of the transverse beams, a plurality of longitudinal beams, 2, 3 and 4 are provided. The inner and outer beams 2 and 4 extend from one end of the frame to the other, being secured to the transverse beams and to suitable auxiliary transverse beams 5, arranged adjacent each end of the vehicle. The center longitudinal beams 3 are secured to the front transverse beam and the center transverse beam, but terminate at a point in front of the rear auxiliary transverse beam 5 (see Figure 3). A forward crank shaft 6 is arranged on the frame, being supported in suitable bearings 7, secured to the beams 2 and 4. The shaft is provided with a pair of offset portions 8, providing a crank 9 arranged centrally thereof, and with offset portions 10, at each side of the center, forming cranks 11. The rear crank shaft 12 is provided with offset portions 13, forming a pair of cranks 14, and is further provided with centrally arranged offset portions 15, forming an actuating member 16. A pair of longitudinal beams 17 are secured to the crank 9 of the forward shaft and to the cranks 14 of the rear shaft. These beams may be connected by a suitable transverse reenforcing member 18, as shown. Arranged adjacent the cranks 11 of the forward shaft are a pair of inclined blocks 19 and a similar pair of blocks 20 are provided at the rear of the jack beyond the rear shaft. One end of the forward shaft is provided with an offset portion 21 having an ear 22, for the reception of a chain 23. This chain is secured to a pivoted lever 24, mounted in a suitable supporting bracket 25. By means of the lever, the forward crank shaft may be operated by hand to raise and lower the longitudinal beams.

Adjacent the rear of the machine, an auxiliary shaft 26 is provided, having a pair of crank portions 27, arranged beneath the free ends of the center longitudinal beams 3. This shaft is provided with an actuating handle 28. A chain 29 is secured to the handle, the opposite end of the chain being secured to a hinged runway 30, secured to the rear of the frame, as at 31.

In operation, with the parts in the position shown in Figure 1 of the drawings, the vehicle is driven up the runway 30, over the inclined blocks 20. The front axle, or other portion of the machine engages the actuating member 16, which is in raised position when the beams are lowered, being arranged at substantially right angles to the cranks 14. The engagement of the vehicle with the actuating member 16 moves this member through a portion of a revolution as the machine is moved forward, until the axle or other portion of the vehicle clears the actuating member. The partial revolution of the actuating member initially raises the longitudinal beam 17 to a position slightly below the frame of the vehicle, and ready to engage it. The vehicle continues forward until the front wheels pass onto the front inclined blocks 19 when the wheels engage the members 11, which are in a partially raised position. Continued forward movement of the vehicle forces these members downwardly to raise the longitudinal beams to their highest point. The position of the longitudinal beams and the actuating members 11 at this time is illustrated in dotted lines in Figure 4 of the drawings. It will be noted that the vehicle wheel shown in dotted lines is arranged at the front of the inclined members 19, when the crank 9 is in its highest position, and just about to pass center. As the forward movement of the vehicle is continued, the actuating members 11 are lowered to the full line position, and the crank 9 moves past center, thus moving the longitudinal beams forwardly and allowing the wheels of the vehicle to move past the inclined blocks.

When the vehicle is to be run off the jack the lever 28 is moved forwardly to revolve the auxiliary shaft 26 and raise the crank portions 27. This raises the free ends of the longitudinal beams 3 to the dotted line position shown in Figure 3 of the drawings, in engagement with the rear wheel shown in dotted lines. Traction is thus furnished to permit the vehicle to be run off the jack under its own power. As the wheels pass over the hinged runway, 30, which is raised to the dotted line position shown in Figure 4 of the drawings, when the handle 28 is moved forwardly, the vehicle wheels lower the hinged runway, and thus return the free ends of the beams 3 to their normal position.

It is to be understood that the form of my invention herewith shown and described is to be taken as a preferred example of the same, and that various changes in the shape, size, and arrangement of parts may be resorted to without departing from the spirit of the invention, or the scope of the subjoined claims.

Having thus described my invention, I claim:

1. A vehicle jack comprising a frame, a pair of shafts arranged on said frame, cranks carried by said shafts, supporting beams secured to said cranks, an actuating member carried by one of said shafts to initially raise said supporting beams, and means operable by the vehicle to raise said beams into engagement with a portion of the vehicle.

2. A vehicle jack comprising a frame, a pair of shafts secured thereto, cranks arranged on said shafts, longitudinal supporting beams secured to said cranks, an actuating member carried by one of said shafts to initially raise said supporting beams, and cranks carried by the other shaft operable by the vehicle to raise said beams into engagement with a portion of the vehicle.

3. A vehicle jack comprising a frame, a pair of shafts mounted on said frame, cranks carried by said shafts, supporting beams secured to said cranks, an actuating member carried by one of said shafts to initially raise said supporting beams, a pair of cranks carried by the other shaft at substantially right angles to said first mentioned cranks, a pair of inclined blocks arranged adjacent said cranks over which the wheels of the vehicle are adapted to pass, and means for positioning said wheels forwardly of said inclined blocks.

4. In a vehicle jack, the combination with a pair of longitudinal supporting beams adapted to engage a portion of the vehicle, and means for raising said beams to elevate the wheels of the vehicle, of movable traction members adapted to engage the rear wheels when in elevated position, and means for actuating said movable traction members.

5. In a vehicle jack, the combination with a pair of longitudinal supporting beams adapted to engage a portion of the vehicle, and means for raising said beams to elevate the wheels of the vehicle, of a pair of beams arranged in the path of the rear wheels, the ends of said beams adjacent said wheels being capable of vertical movement, a shaft arranged beneath the vertical movable end of said beams, and cranks mounted on said shaft adapted to engage the free ends of said beams to raise them into engagement with the wheels of the vehicle.

6. A vehicle jack comprising a frame, a pair of shafts mounted on said frame, one of said shafts being provided with a centrally arranged crank portion and a pair of cranks at each side thereof and projecting at substantially right angles to said centrally arranged crank portions, the other shaft being provided with a pair of crank portions arranged at substantially the same angle as said centrally arranged crank portion, and an actuating member arranged at substantially right angles thereto, a pair of longitudinal beams secured to the centrally arranged crank portion of the first shaft and the pair of crank portions of the second shaft, a pair of inclined blocks arranged adjacent the pair of cranks carried by said first shaft, and vertically movable beams adapted to engage the rear wheels of the vehicle to permit the vehicle to be removed from the jack.

In testimony whereof I affix my signature in presence of two witnesses.

EUGENE I. CUSTER.

Witnesses:
PAULINE J. CAUTHEN,
CHAS. F. BURROWS.